United States Patent [19]
Chan et al.

[11] Patent Number: 6,090,754
[45] Date of Patent: *Jul. 18, 2000

[54] SURFACTANT BLENDS FOR WELL OPERATION

[75] Inventors: Albert F. Chan, Plano; Kieu T. Ly, Richardson, both of Tex.

[73] Assignee: Atlantic Richfield Company, Los Angeles, Calif.

[*] Notice: This patent is subject to a terminal disclaimer.

[21] Appl. No.: 08/987,726

[22] Filed: Dec. 9, 1997

Related U.S. Application Data

[60] Continuation-in-part of application No. 08/746,790, Nov. 15, 1996, Pat. No. 5,830,831, which is a division of application No. 08/439,162, May 11, 1995, abandoned.

[51] Int. Cl.[7] .............................. C09K 7/02; C09K 7/06; B01J 13/00
[52] U.S. Cl. .......................... 507/110; 507/211; 516/28; 516/30; 516/72; 516/76
[58] Field of Search ................................. 507/110, 211; 252/312; 516/28, 30, 72, 76

[56] References Cited

U.S. PATENT DOCUMENTS

| | | | |
|---|---|---|---|
| 3,070,162 | 12/1962 | Barnard, Jr. | 166/38 |
| 3,529,666 | 9/1970 | Crowe | 166/300 |
| 3,653,441 | 4/1972 | Tuttle | 166/291 |
| 3,756,319 | 9/1973 | Holm et al. | 166/304 |
| 3,884,302 | 5/1975 | Messenger | 166/291 |
| 4,423,781 | 1/1984 | Thomas | 166/312 |
| 4,528,106 | 7/1985 | Grolitzer | 252/8.55 D |
| 4,565,647 | 1/1986 | Llenado | 252/354 |
| 4,648,453 | 3/1987 | Nagra et al. | 166/281 |
| 4,681,164 | 7/1987 | Stacks | 166/304 |
| 4,856,589 | 8/1989 | Kuhlman et al. | 507/211 |
| 4,985,154 | 1/1991 | Balzer et al. | 507/211 |
| 5,030,366 | 7/1991 | Wilson et al. | 252/8.551 |
| 5,164,116 | 11/1992 | Berkhof et al. | 252/331 |
| 5,221,343 | 6/1993 | Grauer et al. | 106/729 |
| 5,268,126 | 12/1993 | Balzer | 516/72 |
| 5,374,361 | 12/1994 | Chan | 507/211 |
| 5,458,197 | 10/1995 | Chan | 166/304 |
| 5,466,746 | 11/1995 | Geck et al. | 524/837 |
| 5,605,651 | 2/1997 | Balzer | 516/72 |
| 5,627,144 | 5/1997 | Urfer et al. | 507/211 |
| 5,663,137 | 9/1997 | Giesen et al. | 510/470 |
| 5,830,831 | 11/1998 | Chan et al. | 507/211 |

FOREIGN PATENT DOCUMENTS

WO 86/06404  11/1996  WIPO.

OTHER PUBLICATIONS

"Interfacial Tensions and Solubilizing Ability of a Microemulsion Phase That Coexists With Oil Brine", *Journal of Colloid and Interface Science*, vol. 71, No. 2, Sep. (1979).

SPE 25181 "Surfactants: Additives to Improve the Perfomance Properties of Cements" by K.M. Cowan, Shell Development Co., and Larry Eoff, Halliburton Services, Society of Petroleum Engineers, Inc, (1993).

"Product Line of Sugar Lipids", Simusol * SL, Seppic, Inc., 30, Two Bridges Rd., Suite 225, Fairfield, New Jersey 07006, U.S.A., (1993).

Primary Examiner—Philip Tucker
Attorney, Agent, or Firm—F. Lindsey Scott

[57] ABSTRACT

Surfactant compositions for wellbore operations consisting essentially of a first surfactant selected from the group consisting of alkyl polyglycosides containing alkyl groups containing an odd number of carbon atoms from about 9 to about 13 carbon atoms and a second surfactant selected from the group consisting of alkyl polyglycosides containing alkyl groups containing from about 12 to about 18 carbon atoms and a third surfactant selected from the group consisting of linear ethoxylated alcohols containing from about 8 to 12 carbon atoms and from about 2 to about 8 ethylene oxide groups and a method for formulating such surfactant compositions.

14 Claims, 3 Drawing Sheets

2(a)

2(b)

2(c)

2(d)

SURFACTANT BLENDS FOR WELL OPERATION

CROSS-REFERENCE TO RELATED APPLICATIONS

This application is a continuation-in-part of U.S. Ser. No. 08/746,790 entitled "Surfactant Blends for Well Operations", filed Nov. 15, 1996 now U.S. Pat. No. 5,830,831 by Albert F. Chan and Kieu T. Ly which is a divisional of U.S. Ser. No. 08/439,162, entitled "Surfactant Blends for Well Operations", filed by Albert F. Chan and Kieu T. Ly, May 11, 1995, now abandoned.

BACKGROUND OF THE INVENTION

1. Field of the Invention

The present invention pertains to surfactant compositions for wellbore operations and methods for formulating such compositions from alkyl polyglycoside surfactants and linear ethoxylated alcohol surfactants which form Winsor type III microemulsions, in selected oil/water systems and which are particularly useful in wellbore operations.

2. Background

The failure to perform an effective cleanout operation during drilling or workover of an oil or gas well, or an acidizing treatment of a formation interval, or to establish a bond between a cement composition and a wellbore wall or a casing or tubing can cause undesirable results in oil and gas well operations. For example, failure to perform an effective cleanout operation during drilling or workover of an oil well can result in contamination and plugging of an earth formation from which fluids are desired to be produced. Moreover, during an acidizing treatment of an earth formation to make the formation more productive, if oil based contaminants in the formation interval adjacent to a wellbore are not removed therefrom the effectiveness of the acidizing treatment can be substantially reduced. Still further, ineffective cleaning of a wellbore wall, including a casing, liner or tubing string, can result in a poor cement bond during cementing operations thereby allowing an undesirable flow of fluids along the wellbore or a failure to stabilize the casing in the wellbore. The cost of remedial action for any of the above-mentioned failures can be substantial in both onshore and offshore well operations. Moreover, contamination of a formation interval with unwanted oil based materials can be ruinous.

U.S. Pat. No. 5,374,361, issued Dec. 20, 1994 to Albert F. Chan, is directed to providing an improved method of removing oil based material from a wellbore using a washing composition containing an alkyl polyglycoside surfactant which comprises 1.0% to 10.0% by weight of the composition and with a co-surfactant selected from a group consisting of linear alkyl ethoxylate and alkyl phenol ethoxylate. Still further, U.S. Pat. No. 5,458,197, issued Oct. 17, 1995 to Albert F. Chan is directed to improved cleanout systems for wellbores using alkyl polyglycoside surfactants. Both these patents are hereby incorporated in their entirety by reference. Notwithstanding the improvements in well cleanout operations described and claimed in these patents, there has been a need to provide a cleanout composition which has suitable characteristics for solubilizing substantially all of the oil based materials expected to come into contact with the composition. Moreover, this solubilization characteristic should be substantial while providing a range of a hydrophilic-lipophilic balance of the composition as broad as possible, since, for example, the salinity of fluids present in a well and an adjacent earth formation may vary considerably. Accordingly, the range of the microemulsion formed by the surfactant solution, as a function of the hydrophilic-lipophilic balance (HLB) is desired to be made as broad as possible.

Alkyl polyglycoside surfactants in electrolyte solutions having a pH of about 4.0 or less have good wettability, suspension of contaminant particles and solubilization of oily coatings on surfaces. The acidic nature of cleaning solutions of this type is such as to also show a distinct capability of dissolving carbonate and calcite scales and iron oxide. Solutions of alkyl polyglycoside surfactants, in combination with caustic materials such as sodium hydroxide and potassium hydroxide, are also particularly effective in removing oil based drilling fluids, pipe thread sealant and lubricant materials and other oil based contaminants found in wellbores, including diesel oil, mineral oil, synthetic oils and crude oil as well as other naturally occurring hydrocarbon substances. Alkyl polyglycoside surfactants remain very surface active at relatively high pH and therefore can be used effectively as wetting, dispersing and/or emulsifying agents in a caustic environment, such as encountered in cement slurries, for example. Moreover, alkyl polyglycoside surfactants remain active at relatively high temperatures, up to about 350° F., for example, because alkyl polyglycoside molecules have a superior hydrogen bonding capability as compared with other typical nonionic surfactants such as ethoxylated alcohols.

The oil soluble portion of alkyl polyglycoside surfactants may be controlled by the alkyl chain length which can be varied from about C4 to about C20. Each saccharide group is believed to be equivalent to five to seven ethylene oxide groups in ethoxylated alcohol surfactants and is therefore very effective in rendering water soluble properties to alkyl polyglycoside surfactants even at high temperatures and the high salinity and hardness conditions found in sea water and subsurface brines, for example. Moreover, since oil, brine and the above-mentioned contaminants are usually present in an oil well, for example, it is desirable to provide an alkyl polyglycoside composition for well cleanout and formation interval decontamination, which exhibits very low interfacial tension and forms a Winsor type III microemulsion over the broad temperature ranges typically encountered in both shallow and deep oil and gas wells.

Still further, since the temperature or the salinity of fluids present in a well may vary considerably, the range of the microemulsion formed by a surfactant composition, as a function of the HLB is, as mentioned previously, desired to be made as broad as possible. Additionally, the breadth of the middle-phase or Winsor Type III microemulsion, as a function of the HLB number is also desired to be made as broad as possible.

Although alkyl polyglycoside surfactants have become popular in various detergent compositions, primarily directed to institutional and household cleaning products which are not exposed to the extremes encountered in wellbore cleanout processes, these products have been developed with relatively short alkyl chain length surfactants from C4 to C10 which do not provide sufficient emulsifying properties to emulsify oils frequently found in wellbores. On the other hand, relatively long alkyl chain length surfactants such as C16 to C18 which do not provide sufficient wetting properties have been used in emulsified cosmetic cleansing products. Further the longer alkyl chain length alkyl polyglycosides, especially the polyglycosides containing an even number of carbon atoms, are surfactants which are too viscous for convenient mixing to provide surfactants to meet varied wellbore conditions. The compositions with the shorter alkyl chain lengths act as good hydrotropes or wetting agents and the compositions with the longer alkyl chain lengths have good emulsifying properties, but none of these commercially available compositions, used alone, are deemed optimal for conditions wherein a relatively broad range of salinity of wellbore fluids and a relatively broad operating temperature range are encountered. Accordingly, there has been a pressing need to develop improvements in alkyl polyglycoside surfactant compositions used generally in the methods and systems described in earlier patents as well as in other well operations and related activities wherein oil based contaminants commonly found in wells are present and are desirably removed.

SUMMARY OF THE INVENTION

The present invention provides improved surfactant compositions, particularly useful in well operations, including wellbore cleanout, cementing, and formation interval acidizing, in connection with the production of oil and gas from such wells which are particularly adapted for removal of oil based drilling fluids, pipe thread sealant and lubricant materials, crude oil and other organic or oil based materials present in wellbores and near formation intervals during drilling and completion processes. The improved surfactant composition consists essentially of a first surfactant selected from the group consisting of alkyl polyglycosides selected from the group consisting of alkyl polyglycosides containing alkyl groups containing an odd number of carbon atoms from about 9 to about 13 and having an oligomer distribution from 1 to 12 and a second surfactant selected from the group consisting of alkyl polyglycosides containing alkyl groups containing from about 12 to about 18 carbon atoms and having an oligomer distribution from 1 to 12 and a third surfactant selected from the group consisting of linear ethoxylated alcohols containing from about 8 to about 12 carbon atoms and from about 2 to about 8 ethylene oxide groups.

Still further, the invention comprises a method for formulating surfactant compositions particularly useful in well operations which are made up of a blend of the first surfactant, the second surfactant and the third surfactant which provide improved ranges of solubilization and hydrophile-lipophile balance for specific oil/water systems.

DESCRIPTION OF THE PREFERRED EMBODIMENTS

Figure 1:
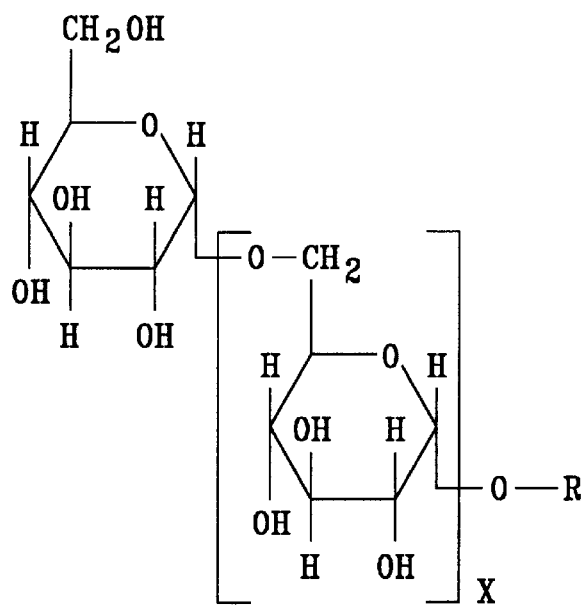
FIG. 1 is a diagram of the molecular structure of an alkyl polyglycoside.

Alkyl polyglycoside surfactants consist of a polar glucose head and an organic carbon chain off of the hemiacetal linkage. A representation of the molecule is shown in FIG. 1. There are two ether oxygens and three hydroxyl groups per glucose unit, plus a terminal hydroxyl group. The lipophilic portion of the molecule resides in the alkyl chain R. R can be a linear or branched alkyl chain containing from 4 to 20 carbon atoms. The polymerization reaction can provide oligomer distributions from x=0 to x=11.

Generally, alkyl polyglycoside surfactants have no cloud point limitation as do ethoxylated alcohols. Moreover, ethoxylated alcohol surfactants are sensitive to temperature variation as normally encountered in wellbore operations, and they are subject to a narrowing of the Winsor type III microemulsion range and become more oil soluble and oil-like at temperature gradients normally encountered in wellbore operations (for example, 60° F. to about 350° F.). In this regard surfactant solutions which comprise substantially ethoxylated alcohols have not been highly successful in completely cleaning out a wellbore to remove oil based drilling fluids as well as hydrocarbon based pipe sealants and lubricants which remain in a well in significant quantities upon completion of the installation of the casing as well as the production or working tubing strings. It has been determined that the removal of these materials from the wellbore usually improves fluid production from an oil well.

It is not unusual that the fluid remaining in a wellbore upon completion of the drilling and casing installation process can contain a significant amount of brine. Accordingly, when the cleaning process is to be carried out it is also desirable to provide a cleaning solution which is stable over a relatively wide range of temperatures, is tolerant of both caustic and acidic fluid compositions, which may be used to facilitate the cleaning process and which is tolerant of a relatively wide range of salinity of the fluids to be displaced from the well. The compositions in accordance with the present invention exhibit a Winsor type III or so-called middle-phase microemulsion which actually expands its breadth, as a function of HLB number with increasing temperature rather than decreasing in breadth. Winsor type III or middle-phase microemulsions are discussed in more detail in "Micellization, Solubilization, and Microemulsions", Volume 2, K. L. Mittal, Plenum Press, New York, 1977.

Figure 2:
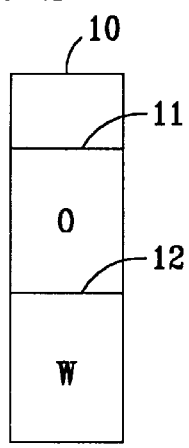
FIGS. 2(a) through 2(d) shows four oil/water systems including Type I, Type II and Type III microemulsions.
Figure 2:
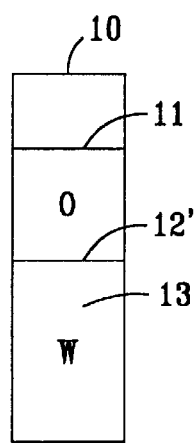
Figure 2:
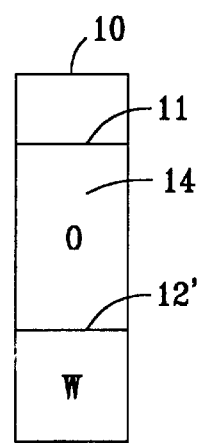
Figure 2:
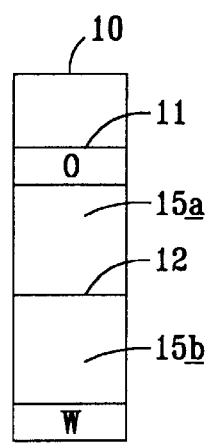

In FIG. 2 Type I, Type II and Type III microemulsions are shown. FIG. 2(a) shows oil (o) and water (w) containing surfactants in a container 10 to a level 11 and having an interface 12. In FIG. 2(b) a Type I microemulsion 13 which is an oil-in-water microemulsion is shown below an excess oil layer. Such microemulsions are water soluble and contain quantities of solubilized oil as shown by the level of the new interface 12' which is above the original interface 12. In FIG. 2(c) a Type II microemulsion 14 which is a water-in-oil microemulsion is shown above an excess water layer. Such microemulsions are oil soluble and contain quantities of solubilized water as shown by the level of new interface 12' which is below the original interface 12. FIG. 2(d) shows a Type III microemulsion 15 which is located between the oil and water phases and extends above and below original interface 12. Such Type III microemulsions are preferred for wellbore operations since their interfacial tensions and solubilization properties toward both oil and/or water can greatly facilitate the removal of both from the wellbore during cleaning operations.

Moreover, alkyl polyglycoside surfactants have been discovered to provide superior wetting of particulate components of cement slurries and the like. This wettability agency characteristic of alkyl polyglycoside surfactants enhances the completeness of hydration of the cement particles and thereby generates greater strength and better bonding of the cement to the wellbore walls. In accordance with the invention, an alkyl polyglycoside composition is selected which will provide a Winsor type I microemulsion in a Winsor type III phase environment system. In other words, the invention contemplates the provision of an alkyl polyglycoside surfactant blend that will produce a middle-phase microemulsion within a particular range of hydrophile-lipophile balance number and this HLB number will then be increased by modifying the blend to provide a Winsor type I microemulsion. These blended alkyl polyglycoside surfactants of higher HLB number will then be used for wetting applications such as inclusion in a cement slurry and the like.

The present invention contemplates that linear alkyl ethoxylated alcohol cosurfactants may be provided in the surfactant composition wherein the ethoxylated alcohol cosurfactant's alkyl chain length varies from $C_6$ to $C_{18}$ and preferably from about $C_8$ to $C_{12}$ and the ethylene oxide groups in combination with the alkyl chain lengths provide an HLB number in the range of about 4.0 to 12.0 and preferably from about 8.0 to about 11.0.

In developing a surfactant composition in accordance with the present invention the solubilization parameter, which is described hereinbelow, for solubilizing substantially all oil in the environment in which the composition is to be used, does not need to be any greater than that which can be determined by testing a sample of the fluid to be cleaned or removed from the area in question. This may be predetermined by determining the concentration of oil based materials, for example, by determining the concentration of oil based contaminants in a formation to be acidized (from a core sample of the formation material), or by determining the concentration of oil based contaminants occupying the well annulus to be cemented by an improved cement composition including an alkyl polyglycoside surfactant in accordance with the invention. When the optimum solubilization parameter has been determined then a blend of surfactants which will provide that solubilization parameter and minimum interfacial tension in a middle-phase microemulsion is provided from data such as that presented in FIGS. 3 through 6 of the drawing.

The HLB number used in the diagrams of FIGS. 3 through 6 is a "pseudo" HLB number (PHLB) which is derived by multiplying the molar fraction of each surfactant in the surfactant composition by its HLB number and summing the results to arrive at the "pseudo" HLB number. For example, if surfactant A has an HLB of 12.0 and is present in the composition as 0.80 mole fraction, then its contribution to the HLB number is 9.6 and if surfactant B has an HLB number of 10.0 and is present in the composition as 0.20 mole fraction, then its contribution to the HLB number is 2.0, providing a combined "pseudo" HLB number of 11.6.

The solubilization parameter described herein may be determined by providing a known quantity of oil together with a known quantity of surfactant and water or brine, mixing the two thoroughly, equilibrating in a constant temperature air or water bath, and then measuring the amount of Type I, or II, or III microemulsion occupying the volume previously occupied by oil and/or previously occupied by the water. The volume of oil (15a) in FIG. 2(d) or the volume of water (15b) in FIG. 2(d) now occupied by the microemulsion after mixing divided by the volume of active surfactant composition in the original aqueous surfactant solution (w) in FIG. 2(a) determines the values of the solubilization parameters for oil ($SP_o$) and for water ($SP_w$), respectively.

It is contemplated that a surfactant composition having a blend of at least two alkyl polyglycoside surfactants or a blend of at least two alkyl polyglycoside surfactants and a linear ethoxylated alcohol described herein, wherein the total concentration of the surfactant in an aqueous solution is about 0.1% to 10% by weight, will be capable of forming a Type III microemulsion in a temperature range of about 80° F. to 350° F. The total concentration of surfactant as well as the blend of alkyl polyglycoside surfactants and linear ethoxylated alcohol surfactant will be dependent on the concentration of oil based material to be removed from a site being treated.

The surfactant composition comprises a blend of two alkyl polyglycoside surfactants capable of forming a Type III microemulsion in specific oil/water systems. The blend of the two surfactants may be tailored to the need for wettability versus emulsification. For example, as discussed hereinbefore, wettability of cement particles in a cement slurry may be more important than emulsifying oil contaminants in a wellbore or in the cement composition. Moreover, the HLB number may be modified by blending the two alkyl polyglycoside surfactants in proportions which will give the desired HLB. For example, a mixture of 50 mole percent of each of an alkyl polyglycoside surfactant having an alkyl chain length of $C_{11}$ and an HLB of 12.4 with an alkyl polyglycoside having an HLB of 11.7 would yield a composition with an HLB of 12.06. Such a composition will produce a microemulsion with good solubilization parameter values at higher temperatures. An HLB range that provides a Type I microemulsion may then be selected and the surfactant blend quantities adjusted accordingly.

The two alkyl polyglycoside surfactants consist of a first alkyl polyglycoside selected from the group consisting of alkyl polyglycosides containing alkyl groups containing an odd number of carbon atoms from about 9 to 13 with an oligomer distribution from 1 to 12 and a second alkyl polyglycoside surfactant selected from the group consisting of alkyl polyglycosides containing alkyl groups containing from about 12 to about 18 carbon atoms and having an oligomer distribution from 1 to 12. Preferably the surfactant compositions contain from about 20 to about 90 mole percent of the first surfactant and from about 10 to about 80 mole percent of the second surfactant. The second surfactant may contain alkyl groups containing odd or even numbers or both even and odd numbers of carbon atoms within the range from about 12 to about 18 carbon atoms.

Preferably the first surfactant consists essentially of alkyl polyglycosides containing alkyl groups which contain 11 carbon atoms. The alkyl polyglycosides used as the second surfactant are more readily available commercially with alkyl groups which contain even numbers of carbon atoms. The even numbered alkyl groups are representative of naturally occurring alkyl groups. The alkyl groups containing odd numbers of carbon atoms are typically produced in petroleum refining operations and the like. The alkyl polyglycosides containing natural alkyl groups containing even numbers of carbon atoms are much more viscous than the alkyl polyglycosides containing petroleum-based alkyl groups containing odd numbers of carbon atoms which may be branched chain alkyl groups in a comparable carbon atom range. Alkyl polyglycosides having longer even numbered alkyl chains have high pour points and may be solid, semi-solid or highly viscous at room temperature. Accordingly, from about 20 to about 90 mole percent of the first surfactant is used in the surfactant compositions to provide the desired blends having a suitable viscosity for mixing the surfactant and for ease of handling as blended.

The linear ethoxylated alcohols are commercially available and contain from about 8 to about 12 carbon atoms and from about 2 to about 8 ethylene oxide groups per molecule of alcohol and are desirably present in amounts from about 10 to about 50 mole percent of the total of the first, second and third surfactants.

Figure 3:
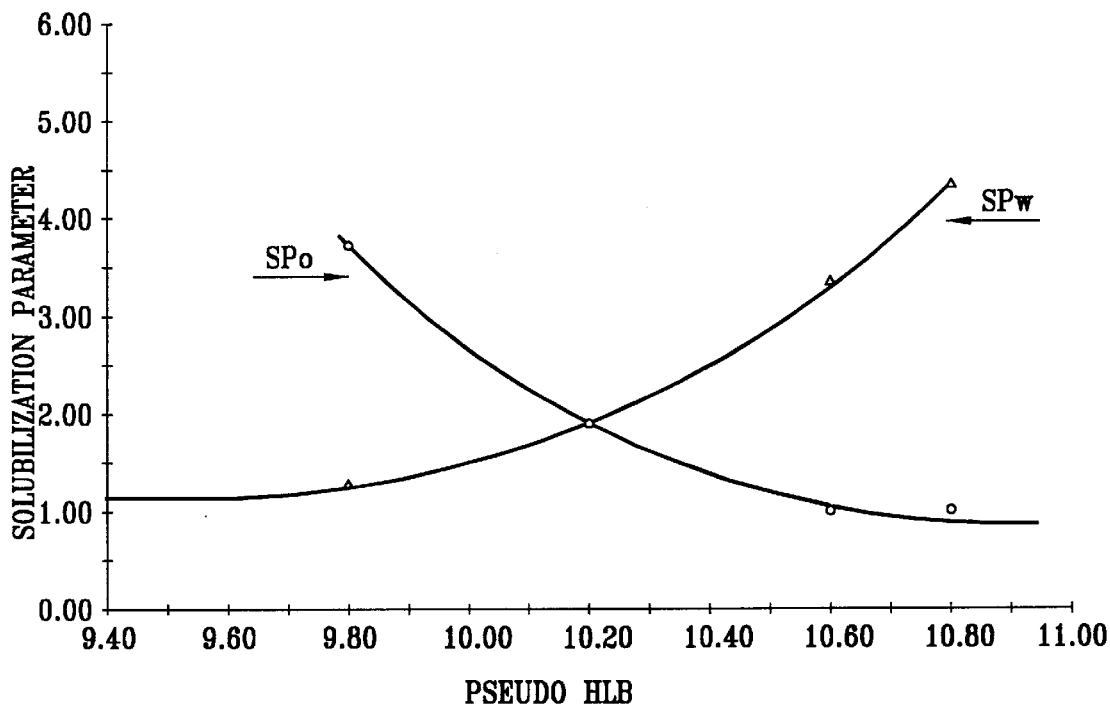
FIGS. 3 through 6 are diagrams showing the solubilization parameters of oil and water as a function of a pseudo hydrophile-lipophile balance (PHLB) number for a type III microemulsion for several exemplary surfactant compositions in accordance with the invention.

FIG. 3 illustrates a diagram of the solubilization parameter versus the PHLB number for one preferred surfactant solution in accordance with the invention and characterized by an alkyl polyglycoside surfactant having an alkyl chain length of $C_{11}$ together with a linear alkyl ethoxylated alcohol cosurfactant wherein the total surfactant concentration was 3.63% by weight in an aqueous solution which also contained 2.76% by weight calcium chloride. Various concentrations of alkyl polyglycoside and ethoxylated alcohol were tested to provide the pseudo HLB (PHLB) numbers indicated while the total concentration of surfactant was held at 3.63%. In each of the tests shown in FIGS. 3 through 6, the composition was 80% water, surfactant and calcium chloride by volume and 20% oil as indicated by the designation 80:20 in the drawing. The solubilization test was carried out at a temperature of 130° F. The "oil" was a synthetic organic drilling fluid base (hereinafter sometimes referred to as the EMN fluid) made up of commercially available compositions including a rheology modifier agent sold under the trade name NOVAMOD, an emulsifier sold under the trade name NOVAMOL and a synthetic oil sold under the trade name NOVASOL. The NOVAMOD, NOVAMOL and NOVASOL compositions were provided in the ratio of 1:4:82 by weight. The above-mentioned compositions are commercially available from MI Drilling Fluids, Inc., Houston, Tex. The cosurfactant was a linear ethoxylated alcohol having an alkyl chain length of $C_9$ to $C_{11}$. A commercial cosurfactant meeting the specification was used and is sold under the trade name NEODOL 91-2.5 by Shell Chemical Company, Houston, Tex. The NEODOL 91-2.5 cosurfactant has an HLB number of 8.5.

The composition of FIG. 3 exhibited a Winsor Type III microemulsion for a range of PHLB of from 9.8 to 10.8 and an optimum solubilization parameter of about 1.99 at the intersection of the curves representing solubilization of oil and water, respectively, and at a PHLB of 10.20. The alkyl polyglycoside surfactant used is manufactured and sold under the trade name SIMULSOL SL 11 by Seppic, Inc., Fairfield, N.J. The SIMULSOL SL 11 surfactant has an alkyl chain length of $C_{11}$ and an HLB of 12.4. SIMULSOL SL 11 surfactant is a non-ionic cleanser primarily developed for household cleaning application.

Figure 4:
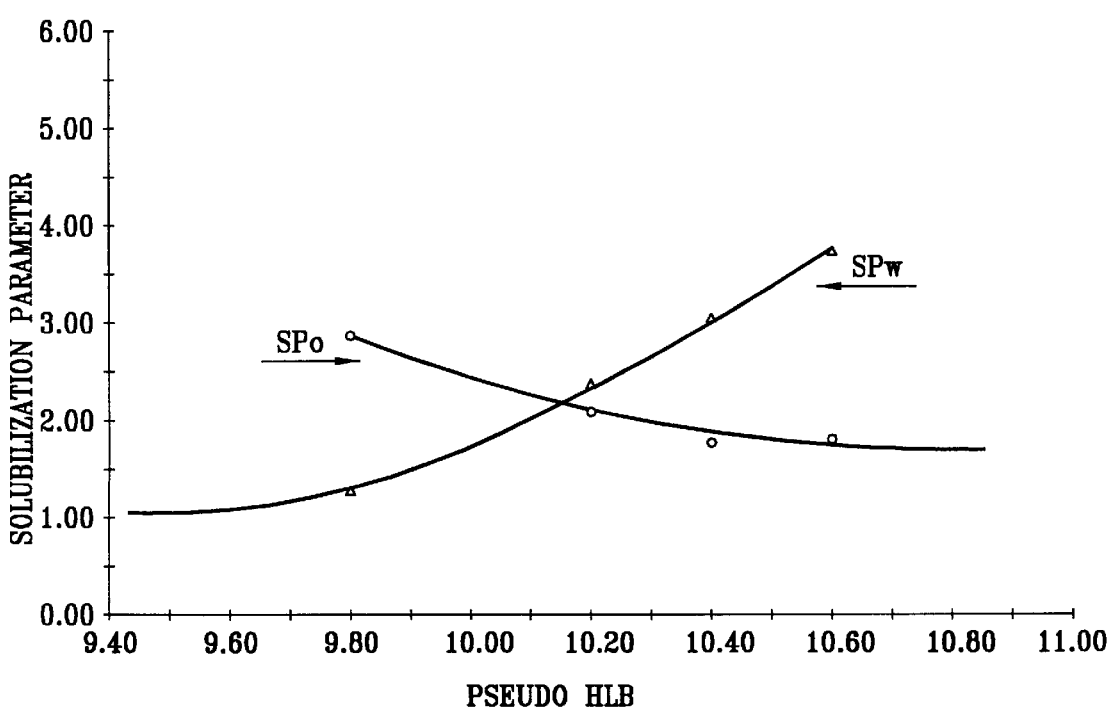

Referring now to FIG. 4, there is illustrated a diagram similar to FIG. 3 showing the solubilization parameter of oil and water as a function of the PHLB number for a surfactant composition totaling 3.63% by weight of a solution of water and calcium chloride wherein the content of calcium chloride is about 2.76% by weight. The surfactant in the solution was characterized by a mixture of alkyl polyglycoside and ethoxylated alcohol surfactants wherein the alkyl polyglycoside surfactant comprised 80 mole percent of an alkyl polyglycoside such as the SIMULSOL SL 11 surfactant and 20 mole percent of an alkyl polyglycoside surfactant, also developed by Seppic, Inc. under their designation SIMULSOL SL 26 and in itself being characterized by a blend of alkyl chain lengths of $C_{12}$, $C_{14}$ and $C_{16}$, respectively, wherein about 65 weight percent to 70 weight percent of surfactant of alkyl chain length $C_{12}$ was typically present. The alkyl polyglycoside surfactant blend in FIG. 4 carries the designation Blend A. The SIMULSOL SL 26 surfactant has an HLB of 11.7, PHLB numbers and gives the Blend A surfactant a PHLB number of 12.27. The cosurfactant was, as indicated, the NEODOL 91-2.5 ethoxylated alcohol. The total solution comprised 80 volume percent of water with surfactant and calcium chloride and 20 volume percent EMN fluid, and the values derived in FIG. 4 are also based on tests at 130° F. FIG. 4 indicates that a PHLB range of 9.8 to 10.6 was achievable for a Winsor Type III microemulsion and that the optimal solubilization of 2.08 occurred at a PHLB number of 10.15.

Figure 5:
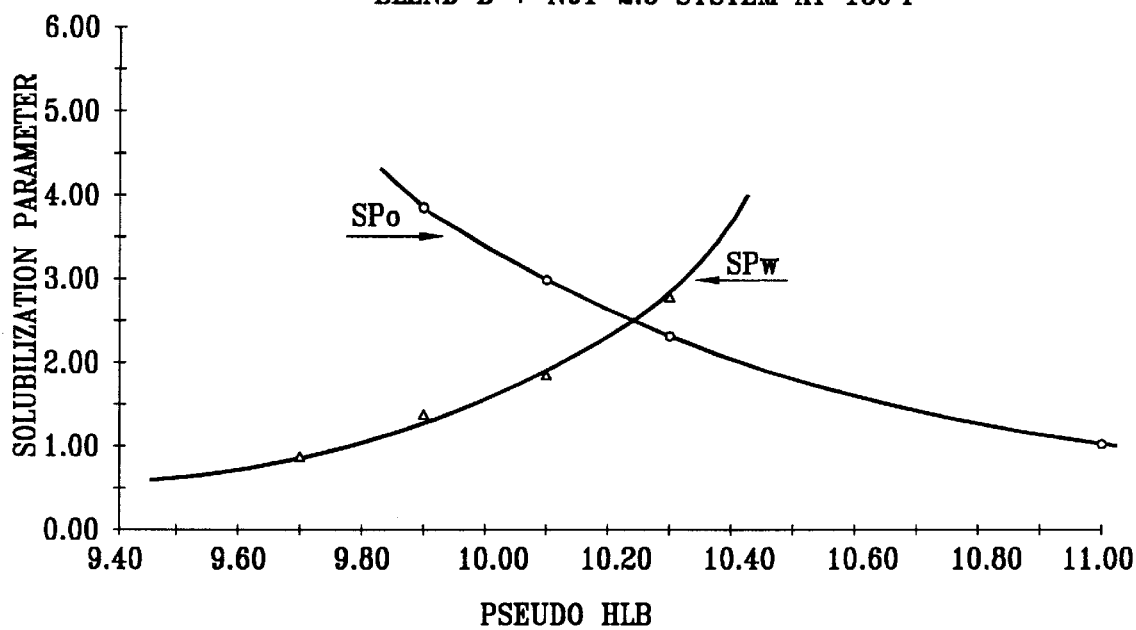

Still further as shown in FIG. 5, a surfactant Blend B comprised of 60% by mole SIMULSOL SL 11 surfactant and 40% SIMULSOL SL 26 surfactant, provided as the alkyl polyglycoside component, together with the ethoxylated alcohol, NEODOL 91-2.5 cosurfactant, totaling 3.63% by weight, was provided in a solution which comprised 2.76% calcium chloride and wherein the surfactant blend and calcium chloride were mixed in water providing a solution which was 80% by volume of the total mixture whereas 20% of the volume was the EMN fluid. As shown in FIG. 5, the Winsor Type III microemulsion existed between a smaller PHLB range of 9.8 to 10.4 PHLB and a larger optimum solubilization of 2.47, a 24% increase over Blend A shown in FIG. 4, occurred at PHLB 10.26. These tests were also carried out at 130° F.

Figure 6:
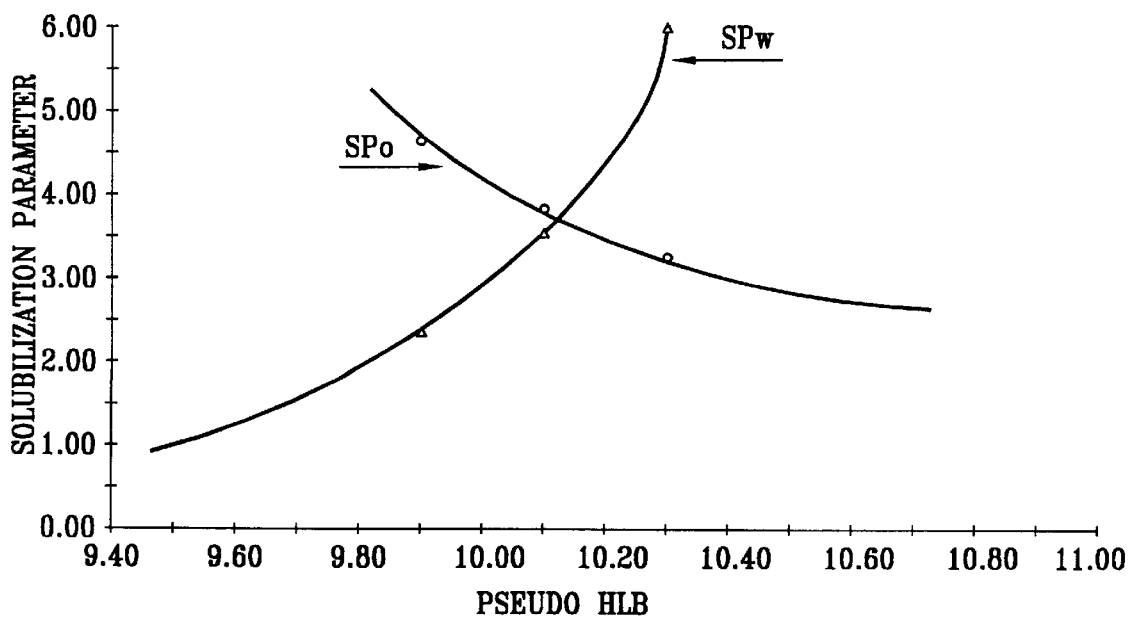

Looking now at FIG. 6, a microemulsion was obtained with the Seppic SIMULSOL SL 26 surfactant together with the ethoxylated linear alcohol, NEODOL 91-2.5, provided in a total amount of 3.63% in the aqueous calcium chloride solution at 130° F. FIG. 6 indicates that the Type III microemulsion existed in an even smaller range of PHLB number from 9.8 to 10.3 and the largest optimum solubilization of about 3.62, an 82% increase over Blend A, was obtained at a PHLB of 10.14. The alkyl polyglycoside surfactant in the test shown in FIG. 6 was 100% of the commercially available surfactant SIMULSOL SL 26 made up of alkyl chain lengths $C_{12}$, $C_{14}$, and $C_{16}$, previously described.

These solutions could also be useful in applications such as pipeline cleaning or pigging operations and as gravel pack or fracture cleaning fluids for wells, for example. Moreover, the present invention contemplates that the alkyl polyglycoside surfactant compositions described and claimed herein may be used in applications including so-called spacer fluids, corrosion inhibitor enhancement fluids, wetting additives in cement slurries, as foaming agents and other cleaning operations associated with hydrocarbon production and transport.

Accordingly, from the foregoing description, it will be appreciated that a unique surfactant composition has been developed characterized by an alkyl polyglycoside composition which consists essentially of a first surfactant selected from the group consisting of alkyl polyglycosides containing alkyl groups containing an odd number of carbon atoms from about 9 to about 13 carbon atoms, a second surfactant selected from the group consisting of alkyl polyglycosides containing alkyl groups containing from about 12 to about 18 carbon atoms and a third surfactant selected from the group consisting of linear alkyl ethoxylated alcohol surfactants containing from about 8 to about 12 carbon atoms and from about 2 to about 8 ethylene oxide groups, and further wherein the concentration of the surfactants is adjusted to improve the wetting properties or provide an optimum solubilization parameter in both water and oil in a middle-phase or Type III microemulsion, over a broad range of so-called pseudo HLB numbers. The first, second and third surfactants are preferably provided in concentrations which provide a hydrophile-lipophile balance of the solution in a range from about 9.8 to about 11.4 and a solubilization parameter of the oil and water in the wellbore of at least about 1.99 at a temperature of about 130° F. These surfactant compositions are particularly useful for wellbore cleanout operations where the salinity and temperature extremes to which the cleanout composition is exposed will not result in degradation of the composition or loss of its effectiveness.

It is contemplated that the surfactant compositions described herein may be included in a wellbore operation such as acidizing a formation interval adjacent to a wellbore and from which formation fluids are desired to be produced. For example, acidizing operations are typically carried out to improve formation productivity by first injecting a "bank" of ammonium salt based brine such as ammonium chloride brine wherein the concentration of ammonium chloride is in the range of about 1.0% to 5.0% by weight. This solution is injected as a so-called preflush solution into the formation interval through the well from which production fluids will eventually be produced. The second step is to inject an acid solution such as a weak, acetic or formic acid solution having a concentration of 1.0% to 15.0%. Alternatively, or in addition, a strong acid solution such as hydrochloric acid in the range of 1.0% to 15.0% may also be injected after or in place of the weak acid solution.

However, conventional acidizing treatments do not adequately dissolve oil based compositions of the type described herein. In this regard, it is contemplated that an acidizing treatment may be carried out wherein, during the injection of the acid solution, a quantity of surfactant composition of the type described herein may be included in the aqueous acid solution in the range of about 0.1% to 10.0% by weight of the surfactant blend including one or more of those described hereinabove.

Still further, the compositions of the present invention may be used in conjunction with well cementing operations by including one or more of the above-mentioned alkyl polyglycoside surfactants as a blend or as one of those commercially available together with the linear ethoxylated alcohol cosurfactant. The total concentration of surfactant should be, by weight, from 0.1% to 5.0% when used as a wetting agent for the solid particulates in the slurry, or from 0.25% to 10% when used primarily as a solubilizing agent, of the total aqueous phase in a cement composition for the lead cement slurry including a cementitious material selected from a group consisting of Portland cement, slag, calcium carbonate, calcium aluminate, calcium sulfate and magnesium/calcium oxide. As the lead cement composition containing surfactant is pumped into the wellbore and flows along the wellbore wall, including the wall surfaces of casing, liner or tubing, any oil based material residing on the wall surfaces such as residual deposits of drilling fluid, for example, will be solubilized by the surfactant to improve cement bonding to the surface.

Those skilled in the art will further appreciate that the above described blended surfactant compositions are produced by a unique method of providing a composition which has a middle-phase or Type III microemulsion with a solubilization of water and oil which can be maximized at a particular HLB number or pseudo HLB number and wherein a significant solubilization of in both water and oil can be obtained to provide the Type III microemulsion over a fairly broad range of HLB or PHLB number. By selectively varying the concentration of alkyl polyglycoside surfactants in the aqueous solution or in an aqueous acid solution or an aqueous alkaline solution of a cement material, improved wellbore operations of the types described hereinabove may be realized.

The selected alkyl polyglycoside surfactants are prepared in an aqueous solution, which may include a chloride brine, such as calcium or sodium chloride, and a quantity of an oil or organic fluid which exhibits properties of oil and tested to determine when a Type III microemulsion is present for a calculated HLB or PHLB number and a solubilization parameter as described above is ascertained for the type III microemulsion for a given HLB or PHLB number. The ratio of alkyl polyglycosides is then varied, respectively, while maintaining the total concentration of surfactant constant until a microemulsion fails to develop.

In each instance, it is contemplated that an optimum or balanced solubilization of oil and water may be achieved within the Type III microemulsion range, such as evidenced by the sample compositions described and illustrated in FIGS. 3 through 6. If a requisite solubilization has been predetermined, as indicated by the amount of oil based material present in the fluid to be displaced from a well, or pipeline or other cleaning operation, the blend of alkyl polyglycoside surfactants and the concentration of the alkyl polyglycoside surfactants and the linear ethoxylated alcohol surfactant may be, respectively, preselected to meet the solubilization needed. This should be done while maintaining as broad a range of HLB or PHLB number as possible in order to provide acceptable cleaning at variable temperature and salinity conditions existing in the well or the earth formation interval being treated.

Although preferred embodiments of the invention have been described in detail herein those skilled in the art will recognize that certain modifications may be made without departing from the scope and spirit of the invention as recited in the appended claims.

We claim:

1. A method for formulating a surfactant composition having a predetermined solubilization parameter of oil and water and wherein the surfactant composition consists essentially of a first surfactant selected from the group consisting of alkyl polyglycosides containing alkyl groups containing an odd number of carbon atoms from about 9 to 13 carbon atoms, a second surfactant selected from the group consisting of alkyl polyglycosides containing alkyl groups containing from about 12 to about 18 carbon atoms and a third surfactant selected from the group consisting of linear alkyl ethoxylated alcohol surfactants containing from about 8 to about 12 carbon atoms in the linear alkyl alcohol and from about 2.5 to about 8 ethylene oxide groups, comprising the steps of:

(a) determining the concentrations of the first surfactant, second surfactant, and third surfactant which will provide the predetermined solubilization parameter in a selected oil/water system by mixing a known volume of oil together with a known volume of a solution of surfactant composition and one of water or brine, measuring the volume of a type III microemulsion occupying a volume previously occupied by the oil and measuring the volume of said microemulsion previously occupied by the water or brine in surfactant solution; and (b) varying the concentrations of the first, second and third surfactants, respectively, in the solution and repeating step (a) until the predetermined solubilization parameter value is provided in a range of concentration of the first surfactant, second and third surfactant which forms the Type III microemulsion.

2. The method of claim 1 wherein:
   the surfactant composition is present in a range from about 0.1% to about 10.0% by weight of the first, second and third surfactants, collectively, in the solution.

3. The method of claim 1 including the step of:
   providing the first, second and third surfactants in concentrations which provide a pseudo hydrophile-lipophile balance of the solution in a range of at least 9.8 to 11.4 and a solubilization parameter of the oil and water of about at least 1.99 at a temperature of about 130° F.

4. The method set forth in claim 1 wherein:

the solubilization parameter of in oil and in water is determined by dividing the volume of oil occupied by the Type III microemulsion and the volume of water or brine occupied by the Type III microemulsion by the volume of active surfactant composition in the solution.

5. The method of claim 1 wherein the first surfactant comprises from about 20 to about 90 mole percent of the total of the first surfactant and the second surfactant.

6. The method of claim 1 wherein the third surfactant is present in the surfactant composition in an amount equal to from about 10 to about 50 mole percent of the total of the first, second and third surfactants.

7. The method of claim 1 wherein the second surfactant consists essentially of alkyl polyglycosides containing alkyl groups containing an even number of carbon atoms from about 12 to about 16 carbon atoms.

8. The method of claim 1 wherein the second surfactant consists essentially of alkyl polyglycosides containing alkyl groups containing an odd number of carbon atoms from about 13 to about 17 carbon atoms.

9. A surfactant composition for wellbore operations consisting essentially of a first surfactant selected from the group consisting of alkyl polyglycosides containing alkyl groups containing an odd number of carbon atoms from 9 to 13, a second surfactant selected from the group consisting of alkyl polyglycosides containing alkyl groups containing from about 12 to about 18 carbon atoms and a third surfactant selected from the group consisting of linear ethoxylated alcohols containing from about 8 to about 12 carbon atoms in the linear alkyl alcohol and containing from about 2.5 to about 8 ethylene oxide groups.

10. The composition of claim 9 wherein the first surfactant comprises from about 20 to about 90 mole percent of the total of the first and second surfactants.

11. The composition of claim 9 wherein the second surfactant consists essentially of alkyl polyglycosides containing alkyl groups containing an even number of carbon atoms from about 12 to about 16 carbon atoms.

12. The composition of claim 9 wherein the second surfactant consists essentially of alkyl polyglycosides containing alkyl groups containing an odd number of carbon atoms from 13 to 17 carbon atoms.

13. The composition of claim 9 wherein the third surfactant comprises from about 10 to about 50 mole percent of the total of the first, second and third surfactants.

14. The composition of claim 9 wherein the surfactant composition comprises from about 0.1 to about 10.0 weight percent of the surfactants.

* * * * *